Figure 1:
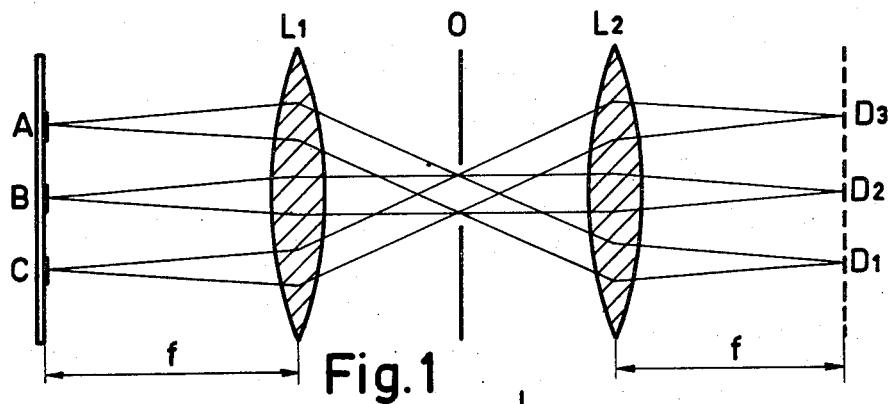

United States Patent [19]
Kock et al.

[11] 3,794,406
[45] Feb. 26, 1974

[54] METHOD OF AND APPARATUS FOR OPTICAL MULTIPLE FILTERING

[75] Inventors: Manfred Kock, Norderstedt; Hermann Weiss, Hamburg, both of Germany

[73] Assignee: U.S. Philips Corporation, New York, N.Y.

[22] Filed: Sept. 11, 1972

[21] Appl. No.: 288,106

[30] Foreign Application Priority Data
Sept. 18, 1971 Germany............................ 2146729

[52] U.S. Cl.......................................... 350/162 SF
[51] Int. Cl. ............................................. G02b 5/18
[58] Field of Search............................... 350/162 SF

[56] References Cited
UNITED STATES PATENTS
3,597,069 8/1971 Heinonen, Jr. ................. 350/162 X
3,677,616 7/1972 Lewis............................... 350/162 X
3,499,703 3/1970 De Bitetto ....................... 350/162 X
3,671,106 6/1972 Groh................................. 350/162
3,561,859 2/1971 Heckscher et al. ............. 350/162 X
3,644,019 2/1972 Bestenreiner et al............... 350/162

Primary Examiner—William F. Lindquist
Attorney, Agent, or Firm—Frank R. Trifari

[57] ABSTRACT

A method of, and an apparatus for, optical multiple filtering in which an object is simultaneously compared with a plurality of filters are described. By causing the object to modulate the spatially separated and spatially incoherent Fourier spectra of the filters and by imaging the modulated spectra on a detector plane in a spatially separated configuration an object may be compared with a large number of filters in a simple optical arrangement.

10 Claims, 7 Drawing Figures

METHOD OF AND APPARATUS FOR OPTICAL MULTIPLE FILTERING

The invention relates to a method of optical multiple filtering in which an object is simultaneously compared with a plurality of filters.

The invention also relates to an apparatus for carrying out the method.

Such a method and apparatus are described by Armitage and Lohmann in "Applied Optics," 1965, volume 4, page 461. The method of multiple incoherent filtering described in the said paper has the disadvantage that the number of filters with which an object may simultaneously be compared is small, and that either only a small part of the intensity of the radiation used for illumination is utilized or an expensive and complicated lens system is required for imaging the object on the various filters.

It is an object of the present invention to provide a method and an apparatus for optical multiple filtering in which the said disadvantages are avoided. The method according to the invention is characterized in that the spatially separated and spatially incoherent Fourier spectra of the filters are modulated by the object to be compared, and in that the modulated spectra are imaged on a detector plane in a spatially separated configuration. Thus a large number of spatially separated Fourier spectra are already produced in the entrance plane of the filter system and are simultaneously correlated with the object to be compared.

The production of the Fourier spectra may be effected in various simple manners. For example an array of a plurality (for example 100) individual filters may be illuminated with sub-beams which are at different angles to one another. Alternatively a lens array or an array of photographically recorded Fourier spectra of the filters may be used. The first-mentioned two methods enable the filters to be simply realized by electro-optical means, as will be set out hereinafter.

Figure 2:
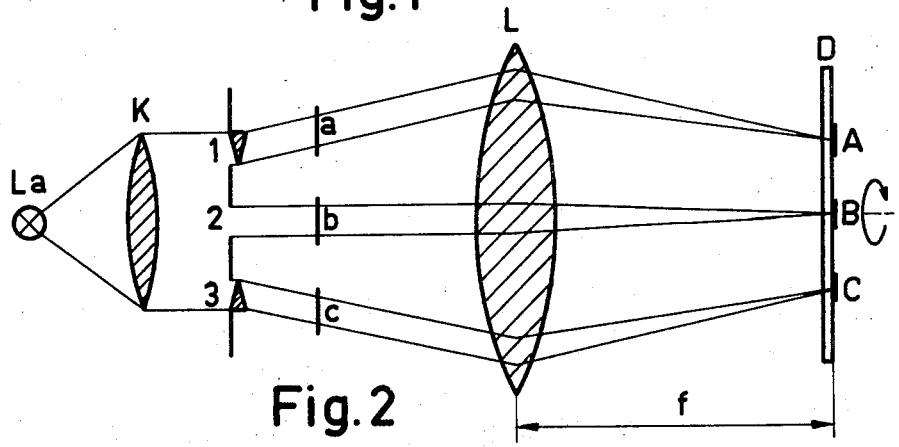
Figures 2A, 2B:
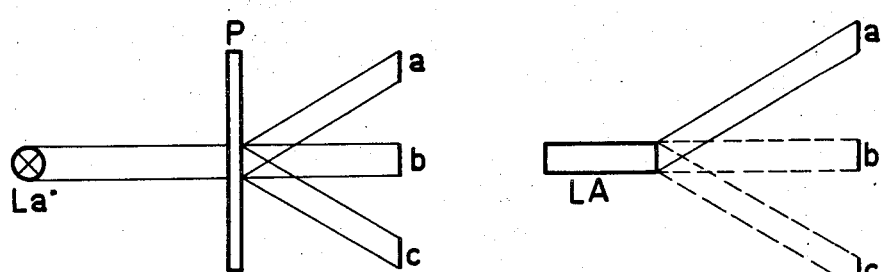
Figure 2C:
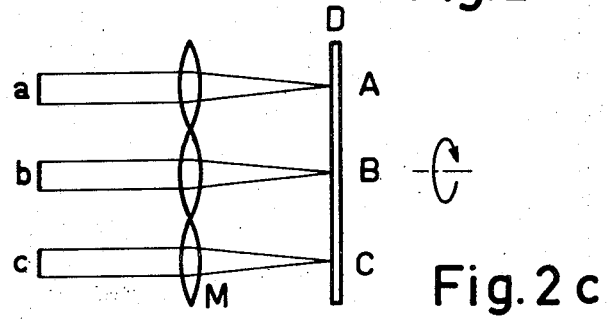
Figure 3:
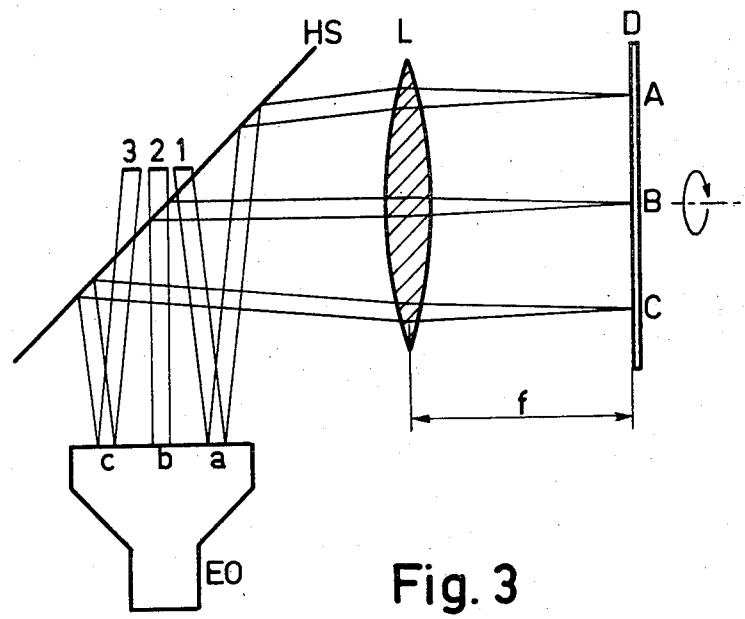
Figure 4:
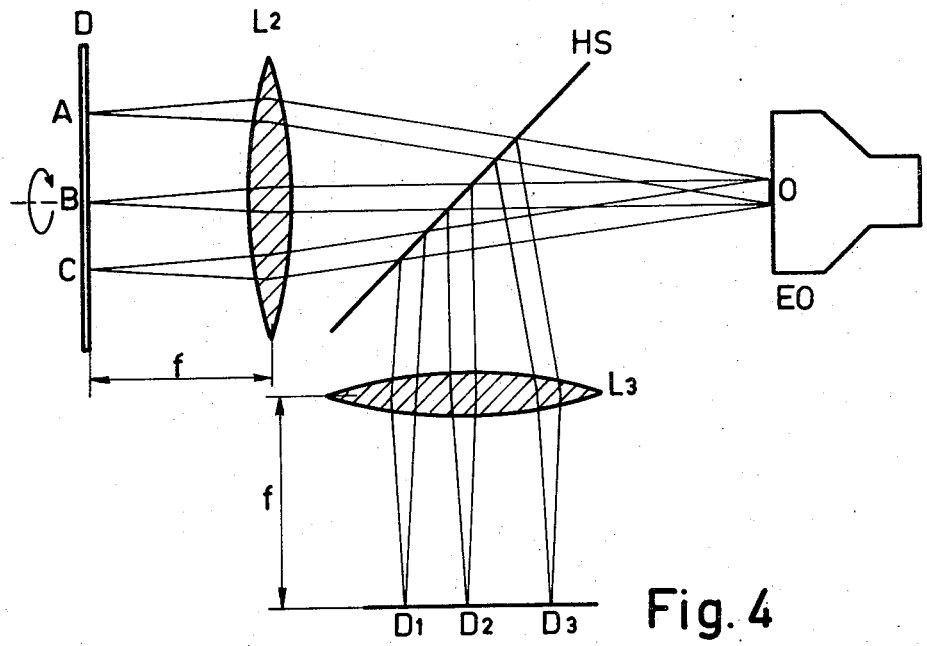

Embodiments of the invention will now be described, by way of example, with reference to the accompanying diagrammatic drawings, in which:

FIG. 1 shows an apparatus for carrying out the method according to the invention, FIGS. 2, 2a, 2b and 2c show various possibilities of obtaining the spatially separated Fourier spectra of the filters, FIG. 3 illustrates the use of an electro-optical arrangement for obtaining a large number of spatially separated Fourier spectra of the filters, and FIG. 4 shows an apparatus according to the invention in which an electro-optical element is the object to be compared.

In the apparatus shown in FIG. 1, 1-to-1 images of spatially incoherent Fourier spectra A, B and C of three filters are produced by lenses $L_1$ and $L_2$ at locations $D_1$, $D_2$ and $D_3$ in the back focal plane of the lens $L_2$. A pupil O, which forms the object to be compared, so modulates the images at the locations $D_1$, $D_2$ and $D_3$ as to enable a decision to be taken with which of the filters whose Fourier spectra are given by A, B and C the object O is identical, for when O corresponds to one of the filters, for example with the filter whose Fourier spectrum is given by A, a bright spot is produced at $D_1$, whereas a dark spot is produced at the locations $D_2$ and $D_3$. For a physical explanation of this phenomenon we refer to the aforementioned paper by Armitage and Lohmann. By placing a simple array of photosensitive detectors at the points $D_1$, $D_2$ and $D_3$ electric signals for further processing, for example automatic processing, of the information may be generated.

FIGS. 2, 2a, 2b and 2c show various apparatuses by means of which the spatially separated Fourier spectra A, B and C of filters a, b and c are obtainable.

In FIG. 2 a light source La, which is coherent in space and time, by means of a collimator lens K illuminates a large number of diaphragm apertures, apertures 1, 2 and 3 being shown by way of example. Prisms arranged behind the diaphragms divide the light beam, which is parallel to the optical axis, into sub-beams which have different directions and illuminate the individual filters, for example a, b and c. The Fourier spectra A, B and C of the filters a, b, and c are formed on a rotating ground-glass plate D arranged in the back focal plane of the lens L. Owing to the different directions of the sub-beams these spectra are spatially separated.

FIGS. 2a and 2b show alternative possibilities of forming the sub-beams. The division may readily be effected by means of an image multiplier (P in FIG. 2a) such, for example, as a multiple phase hologram made up of a regular configuration of identical phase holograms the individual structure of which may, for example, consist of symmetrical polygons, such as squares and rectangles. The composite phase hologram is built so as to produce a given distribution of the intensities between the images formed. Alternatively a point hologram of phase structure, which is obtained by illuminating diaphragm holes having considerably larger dimensions than the image points to be formed by means of the hologram, the diaphragm holes — with the exception of a possible magnification factor — including an identical phase or amplitude structure. In the recording operation a diaphragm hole constructed in the same manner as the remaining diaphragm holes may be used as a reference source.

As FIG. 2b shows, in an alternative advantageous embodiment a digital light deflector (LA) may be used which enables the direction of a light beam to be modulated by means of polarization switches and deflecting prisms.

A simple apparatus for obtaining the Fourier spectra A, B and C on the rotating ground-glass plate is a lens array M shown in FIG. 2c.

Instead of projecting the Fourier spectra A, B and C on to a rotating ground-glass plate these spectra may photographically be recorded, the photographic recording being disposed at the position of the ground-glass plate and being illuminated with spatially incoherent light.

FIGS. 3 and 4 show apparatuses according to the invention in which the filters a, b and c and the object O to be compared are realized by means of an electro-optical element EO. In the element EO the incident light is modulated by an electro-optic material such, for example, as a KDP (potassium dihydrogen phosphate) crystal in which optical structures are electronically written. A practical embodiment of this principle is the so-called "Titus" tube in which a crystal which exhibits the Pockels effect is arranged between two polarizers. This tube, which is described in "Philips Research Reports" 22 (1967) p. 110 sqq., forms an optical relay which, spatially and in time, modulates a light beam which passes through the polarizers and the crystal.

In FIG. 3 the Fourier spectra A, B and C of the filters a, b and c written electronically in the element EO are produced by means of a lens L and a half-silvered mirror HS.

In FIG. 4 the Fourier spectra A, B and C are imaged at $D_1$, $D_2$ and $D_3$ by means of lenses $L_2$ and $L_3$ and a half-silvered mirror HS. The images are modulated by the object O which is written in the element EO. A comparison of the object O with the filters is effected in the same manner as in the apparatuses shown in FIGS. 1 and 2.

In the electro-optical element EO different light-modulating structures may be written in rapid succession by electronic means, for example in the "Titus" tube at a rate of 25 images per second. A filtering apparatus in which both the object to be compared and the filters are represented by such an element may be used to particular advantage for the study of learning processes in which the object O changes and is continuously compared with a large number of filters.

What is claimed is:

1. Method of simultaneously comparing an object with a plurality of filters comprising the steps of producing a plurality of spatially separated and spatially incoherent Fourier spectra of the plurality of filters, simultaneously spatially modulating the spectra of all the filters with the object, imaging the modulated spectra on a detector plane in a spatially separated configuration, and comparing the relative amplitudes of the images on the detector plane.

2. Method as claimed in claim 1, wherein the step of producing the Fourier spectra comprises the steps of generating a large number of spatially coherent lightbeams which are inclined to one another at different angles, and causqng each of these sub-beams to form a Fourier spectrum of a filter at a separate location on a rotating ground-glass plate.

3. Method as claimed in claim 1, wherein the Fourier spectra are photographically recorded on a photosensitive plate.

4. Method as claimed in claim 1, wherein the step of producing the Fourier spectra comprises electronically writing the filters in an electro-optical apparatus.

5. Method as claimed in claim 1, wherein the step of modulating the object to be compared comprises the step of electronically writing the object in an electro-optical apparatus.

6. Apparatus for optical multiple filtering of an object, comprising a source of radiation, a plurality of spatial filters, element means for dividing the radiation from the radiation source into a plurality of spatially coherent light beams and for illuminating a separate filter with each beam, a rotating ground glass plate in the path of the light passing through the filters for intercepting and scattering the spatially separated light beams from the filters, optical means for simultaneously spatially modulating all the spatially separated scattered light from the ground glass plate with the object, an imaging surface, and means for imaging the modulated light in a spatially separated configuration.

7. Apparatus as claimed in claim 6, wherein said element means comprises an array of diaphragms followed by prisms.

8. Apparatus as claimed in claim 6, wherein said element means comprises an image multiplier in the form of a phase hologram.

9. Apparatus as claimed in claim 6, wherein said element means comprises a digital light deflector.

10. Apparatus as claimed in claim 6, further comprising an array of identical lenses is inserted in the path of the radiation between the filters and the ground-glass plate.

* * * * *